United States Patent
Mukai et al.

[15] 3,643,723
[45] Feb. 22, 1972

[54] PNEUMATIC TIRE HAVING A BELT MEMBER

[72] Inventors: Tsuneo Mukai; Toshiro Tezuka, both of Tokyo, Japan

[73] Assignee: Bridgestone Tire Company Limited, Tokyo, Japan

[22] Filed: Sept. 29, 1966

[21] Appl. No.: 582,961

[30] Foreign Application Priority Data

Mar. 11, 1966 Japan.................................41/14601

[52] U.S. Cl............................................152/361, 152/354
[51] Int. Cl................................................B60c 9/18
[58] Field of Search.......................152/361, 354, 355, 356

[56] References Cited

UNITED STATES PATENTS

| | | | |
|---|---|---|---|
| 2,782,830 | 2/1957 | Wallace | 152/361 |
| 3,115,921 | 12/1963 | Leibee | 152/361 |
| 3,242,965 | 3/1966 | Mirtain | 152/361 |

FOREIGN PATENTS OR APPLICATIONS

| | | | |
|---|---|---|---|
| 700,790 | 12/1964 | Canada | 152/354 |
| 944,876 | 12/1963 | Great Britain | 152/361 |

*Primary Examiner*—Arthur L. La Point
*Assistant Examiner*—Richard A. Bertsch
*Attorney*—Stevens, Davis, Miller & Mosher

[57] ABSTRACT

A pneumatic tire having a carcass of at least one rubberized sheet including cord elements of flexible material, a tread portion mounted on but spaced from the carcass, and a breaker member mounted between the carcass and tread portion. The breaker member consists of at least two groups of sheets including parallel cord elements with different modulus of elasticity for each sheet. The groups each include at least a pair of sheets with the cord elements of the first group deviating from the equatorial direction of the tire by a first angle and the second group at a second angle larger than the first angle.

10 Claims, 11 Drawing Figures

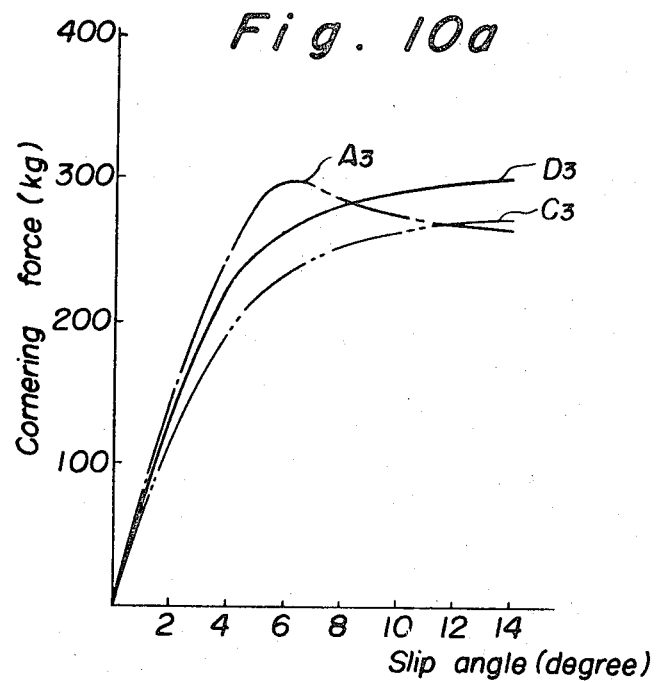
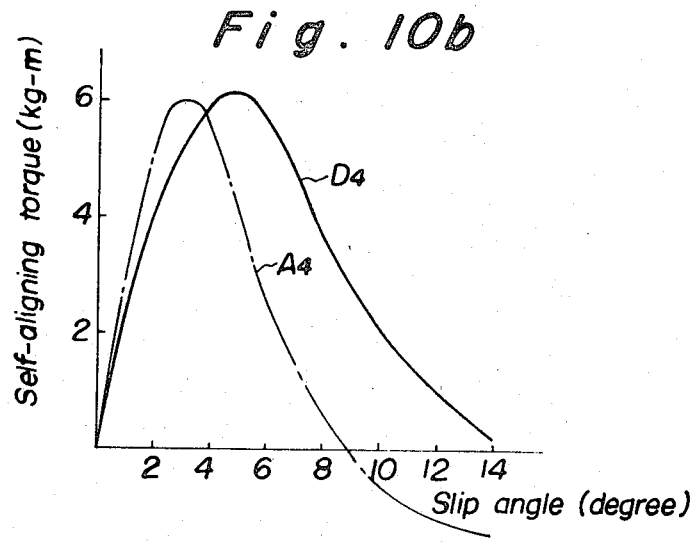

PNEUMATIC TIRE HAVING A BELT MEMBER

This invention relates to an improved pneumatic tire having a belt member.

In order to reduce wearing loss of the tread portion of a pneumatic tire, a belt member having substantially the same width as that of the tread portion of the tire has been heretofore used by inserting it between the tread portion and the carcass of such a pneumatic tire. Such a belt member, which is also referred to as a breaker member, comprises a rubberized sheet including reinforcing elements or a plurality of such rubberized sheets laminated each other.

Metal wires have been used as the reinforcing elements in such laminated sheets of the breaker member of a pneumatic tire. In case of the pneumatic tire thus reinforced, the metal wires are arranged in parallel in each sheet and secured by rubberizing, and the wires in adjacent rubberized sheets run in three different directions, thus producing so-called "triangulation," which are bonded together rigidly so that a high resistance may be provided against relative movement of each rubberized sheet within the breaker member. The breaker member of the aforementioned construction acts to provide the tread portion of the tire with a high rigidity against deformation in both its circumferential and transverse directions, and hence, the wearing loss of the tire tread can be reduced to a great extent.

On the other hand, the pneumatic tire comprising breaker member of such high rigidity has disadvantages in that the maneuverability of vehicles equipped with such tires is low, and that comfortableness to the driver of the vehicles is inferior due to the fact that vibrations and noises of such vehicles are high.

In the aforementioned breaker member including metal wires arranged in the above triangular relations, at least three sheets having metal wires embedded therein in parallel have been laminated in such a fashion that the metal wires in different sheets intersect with the equatorial direction of the tire at three different angles. If three such sheets are used, the angles between the metal wires of the sheet and the equatorial direction of the tire (to be referred to as the "cord angle" hereinafter) for the first two sheets have been selected in the range of 17° to 28°, whilst the corresponding cord angle of the third sheet has been selected in the range of 45° to 90°. The inventors noticed the fact that the disadvantageous operative properties of such tires to be described in detail hereinafter, such as their cornering force characteristics and self-aligning torque characteristics for different slip angles, were caused by the excessive rigidity of the tread portion of the tire.

As means for obviating the above shortcomings of the tire of aforementioned construction by reducing the rigidity of its tread portion, one can easily think of substitution of the metal wires with cord elements made of other flexible materials, such as natural resins, synthetic resins, and other inorganic flexible materials. However, if the cord elements made of such flexible materials are used in the same manner as the metal wires of the tire of aforementioned construction, namely with the cord angles in the ranges of 17° to 28° for the first two sheets and 45° to 90° for the third sheet, then the rigidity of the tread portion of the tire thus produced will be lowered too far from that of the tire including metal wires, and desired operative characteristics will not be obtained.

Furthermore, as a means to obviate the aforementioned difficulties of the tire including metal wires disposed in a so-called triangulation fashion, it has been already proposed to use cord elements disposed in the breaker member of a tire at zero inclination or a small angle to the equatorial direction of the tire. However, such tires including cord elements disposed at zero inclination or a small angle to the equatorial direction of the tires proved to have serious drawbacks in that their rigidity was too low, resulting in excessively low ability to generate the cornering force, which led to very poor operative characteristics of vehicles equipped with such tires.

The inventors have found, as a result of their years of various studies, that it is possible to provide a novel tire having the proper level of rigidity while maintaining the high level of maneuverability without causing any increase in the wearing loss of the tire.

According to a preferred embodiment of the invention, there is provided a pneumatic tire having a breaker member, comprising a pair of bead portions including metal wires, a carcass extending between said pair of bead portions substantially in radial directions radiating from the axis of rotation of the tire, said carcass consisting of at least one rubberized sheet including cord elements made of flexible material, a tread portion mounted on said carcass with a suitable spacing between them, and a breaker member inserted between said tread portion and said carcass, said breaker member consisting of at least a first group of sheets including cord elements of a certain modulus of elasticity and a second group of sheets including cord elements of a different modulus of elasticity, said cord elements in each sheet of the breaker member being laid in parallel within the sheet, said first group having at least a pair of sheets whose cord elements deviate from the equatorial direction of the tire by a first angle on opposite sides of said equatorial direction, said second group having at least a pair of sheets whose cord elements deviate from said equatorial direction by a second angle on opposite sides of the quator, said second angle being larger than said first angle.

In each sheet of the cord member according to the present invention, it is permissible to use cord elements made of either metal wires or other suitable flexible materials, such as natural resins, synthetic resins, and other inorganic flexible materials. If a breaker member is prepared by laminating at least four rubberized sheets comprising cord elements made of suitable flexible materials in the angular relations according to the present invention and by vulcanizing the sheets thus laminated, then there will be formed in the breaker member a structure consisting of a number of parallelograms defined by the cord elements disposed at comparatively small cord angles, say in the range of 5° to 20°, and those cord elements disposed at comparatively large cord angles, say in the range of 13° to 50°, act to reinforce said structure consisting of a plurality of parallelograms in a very effective manner, and hence, the breaker member acts to provide suitable rigidity to the tread portion of the tire of the invention.

Therefore, an object of the invention is to provide a tire having high stability in conjunction with excellent maneuverability by forming the tread portion of the tire so as to have the most suitable rigidity.

Another object of the invention is to provide a novel tire having improved resistivity against wearing loss in both equatorial and lateral (perpendicular to the equator) directions of the tire without sacrificing the ability to ensure the high level of comfortableness of the driver.

A further object of the invention is to provide a pneumatic tire having excellent resistivity against wearing of its tread portion even when it is subjected to a great number of repeated turning operations along a curved path.

For a better understanding of the invention, reference is made to the accompanying drawings, in which;

FIGS. 10a and 10b are curves illustrating the cornering force characteristics and the self-aligning torque characteristics respectively of a conventional radial tire and a tire according to the present invention for different slip angles.

Generally speaking, when a vehicle equipped with pneumatic tires is going to turn round along a curved path, there are produced on the tire a cornering force and a self-aligning torque, of which magnitudes vary responsive to the angle of deflection between the equatorial direction of the tire and the moving direction of the vehicle the (slip angle). The cornering force acts to facilitate the movement of the vehicle along the curved path, and the self-aligning torque acts to reduce the deflection of the vehicle and the tire in order to facilitate movement of the vehicle and the tire along a linear path. The magnitude of the self-aligning torque is given as a product of the cornering force and the distance between the center of that portion of the tire which is in direct contact with the road surface and the point where the cornering force is applied to.

Figure 1:
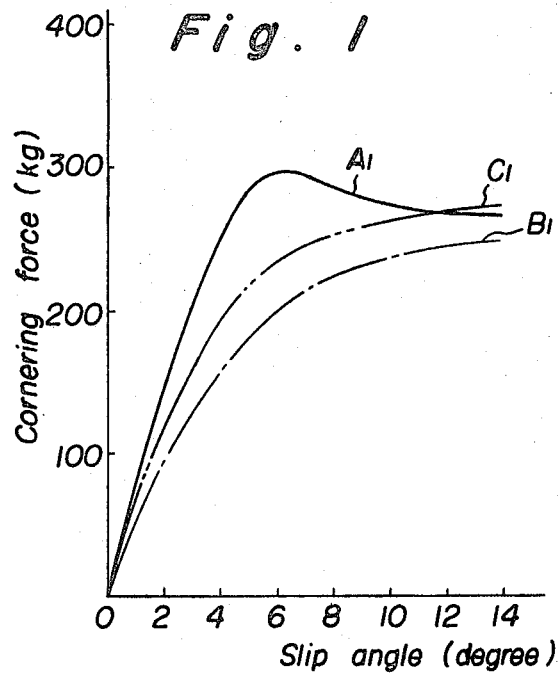
FIG. 1 illustrates curves representing the magnitude of cornering forces of a conventional radial tire and a pneumatic tire of ordinary construction for different slip angles.

In the case of a pneumatic tire having a breaker member including metal wires in a triangular fashion, there are peculiar relations between its cornering force and the slip angle and between its self-aligning torque and the slip angle. Referring to FIG. 1, in which the abscissa represents the slip angle and the ordinate represents the cornering force, the curve $A_1$ designates the cornering force characteristics of a pneumatic tire having a breaker member consisting of metal wires disposed in a triangular fashion. The curve $B_1$ designates the corresponding characteristics of a pneumatic tire of ordinary construction, which has been commonly used heretofore.

In order to turn round a vehicle along a curved path, it is necessary to apply a centripetal force to the vehicle, so that the centrifugal force acting on the vehicle, which is determined responsive to its weight, speed, radius of curvature of the path, etc., may be properly compensated for. The substantial portion of such a centripetal force is produced by the cornering force of the tire mounted on the vehicle. In case of the curve $A_1$ of FIG. 1, the maximum value of the cornering force is produced when the slip angle is about 6°, and as the slip angle increases in excess of 6°, the cornering force is reduced. On the other hand, in case of the curve $B_1$, the maximum value of the cornering force is given when the slip angle is about 14°, and the maximum value of the cornering force is retained for larger slip angles in excess of 14°.

The cornering force characteristics represented by the curve $A_1$ is very dangerous for the driver of a vehicle equipped with tires having said cornering force characteristics. As long as the slip angle is less than about 6°, or less than that slip angle which gives the maximum cornering force according to the curve $A_1$, the rate of generating cornering force of the tire as represented by the curve $A_1$ is larger than that of other conventional tires such as the one represented by the curve $B_1$. The high rate of generating cornering force responsive to the variation of the slip angle generally gives the driver the feeling of high road holding, that is to say the driver feels that there will be no possibility of skidding when he increases the slip angle by further turning the steering wheel. In the case of a tire having the characteristics shown by the curve $A_1$, the aforementioned feeling of high road holding is valid only for the small slip angle, and as soon as the slip angle exceeds a certain limit value, which is about 6° in the case of the curve $A_1$, then the magnitude of the cornering force is gradually decreased from its maximum value, and consequently, the centrifugal force acting on the vehicle is not compensated in full any more, and the vehicle skids away from its desired travelling path.

On the other hand, in case of a conventional tire of ordinary construction having the cornering force characteristics as shown by the curve $B_1$ in FIG. 1, the cornering force is increased slowly in accordance with the increase of the slip angle, and hence, the driver of the vehicle can foresee the danger of skidding well before its occurrence so that he may drive the vehicle safely.

Figure 2:
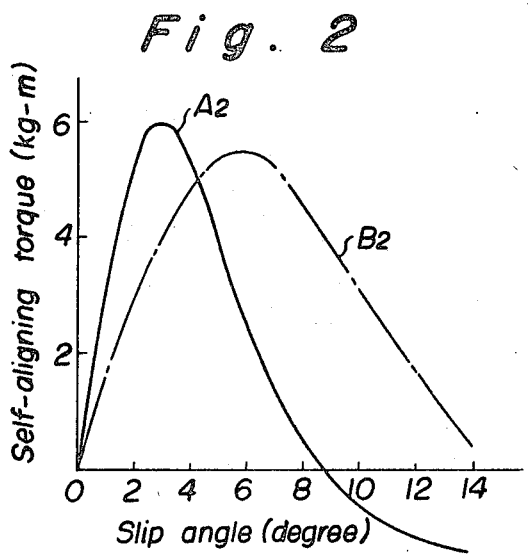
FIG. 2 shows curves representing relations between the slip angle and the self-aligning torque of the tires of FIG. 1.

Referring to FIG. 2, in which the abscissa represents the slip angle and the ordinate shows the self-aligning torque, the curve $A_2$ represents the self-aligning torque characteristics of a pneumatic tire having a breaker member consisting of metal wires disposed in a triangular fashion, and the curve $B_2$ shows the similar characteristics of a conventional tire having ordinary construction. It is apparent from FIG. 2 that the tire having the characteristics shown by the curve $A_2$ produces a larger self-aligning torque than that of the tire of ordinary construction as long as the slip angle is small. The reason for such a difference in the self-aligning torque characteristics of the two tires is in the fact that the former tire has a tread portion having a higher rigidity than that of the latter tire.

According to the curve $A_2$ of FIG. 2, as the slip angle is increased in the region of less than three degrees, the self-aligning torque is increased, while, if the slip angle exceeds 3°, then the self-aligning torque diminishes rapidly responsive to such increase of the slip angle until it reaches zero at the slip angle of about 9°.

On the other hand, in case of a tire of ordinary construction represented by the curve $B_2$, the maximum value of the self-aligning torque is produced when the slip angle is about 6°, which is larger than the corresponding slip angle of the curve $A_2$, and the rate of decrease of the self-aligning torque in the curve $B_2$ is smaller than that of the curve $A_2$.

The self-aligning torque characteristics of the curve $A_2$ are also very dangerous for the driver of a vehicle equipped with tires having such characteristics. In case of a vehicle equipped with ordinary tires, as the steering wheel is rotated to turn round the vehicle, the slip angle and accordingly self-aligning torque of the tires are increased, and hence, the driver feels reasonable resistance on the steering wheel responsive to the increase of the self-aligning torque of the tires. However, if tires having self-aligning torque characteristics represented by the curve $A_2$ are used, then as the slip angle exceeds about 3°, the resistance felt by the driver on the steering wheel against its further rotation is suddenly reduced, and hence, the normally expected feeling of the driver for the increased resistance on the steering wheel responsive to the increase in its angular displacement fails. Thus, the driver may be bewildered and feel unrest upon failure of the occurrence of the expected resistivity on the steering wheel.

Furthermore, if the slip angle of the tire having the self-aligning torque characteristics as shown by the curve $A_2$ is increased in excess of its critical angle, which is about 9°, in order to turn along a very sharp path, then the driver has to apply a steering force to the tire in a direction opposite to what is ordinarily expected. Thus, the driver may loose control of the vehicle. Such conditions are apparently very dangerous.

In addition, when one drives a vehicle equipped with the tire having the characteristics shown by the curve $A_2$ at a slow or intermediate speed, the magnitude of the self-aligning torque is large for small slip angles, which requires a large force to be applied on the steering wheel, and hence, the fatigue of the driver is increased accordingly.

The pneumatic tire having a breaker member consisting of metal wires disposed in a triangular fashion has another disadvantage in that the rigidity of the tread portion of the tire is so high that the levels of vibration and noise of a vehicle equipped with such tires are higher than those caused by ordinary tires, and accordingly, the driver of the vehicle has to experience unendurable discomfort.

In order to obviate the above difficulties by reducing the rigidity of the tread portion of the tire while retaining the wearing loss of the tire at a low level, it has been proposed to arrange the cord elements of the breaker member at zero inclination or a small angle to the equatorial direction of the tire. The wearing loss of the tread portion of the tire is generally caused by its local contraction in the equatorial direction (wiping action) responsive to its contact with the road surface. With a breaker member of the above construction including cord elements arranged at zero inclination or a small angle to the equatorial direction of the tire, the wearing loss of the tread portion may be reduced not by increasing its rigidity but by preventing the occurrence of its creeping by stretching the breaker member with the internal air pressure of the tire. Thus, it is made possible to allow a reduction in the rigidity of the tread portion. However, such reduction of its rigidity also causes a reduction of the cornering force of the tire, which is one of the most important operative properties of the tire, and hence, the overall operative characteristics of such a tire comprising zero inclination cord elements becomes inferior to those of the tire having the aforementioned breaker member including metal wires disposed in a triangular fashion.

The curve $C_1$ of FIG. 1 shows cornering force characteristics of a tire having a breaker member consisting of cord elements arranged at zero inclination or a small angle to its equatorial direction. It is apparent from FIG. 1 that both the magnitude and the rate of generating the cornering force of the curve $C_1$ are considerably less than those of the curve $A_1$ or the cornering force of the tire having a tread portion of high rigidity in the range of small slip angles, say less than about 10°, and at the same time it is noticed that the maximum value of the cornering force of the former tire is lower than that of the latter tire. It has been known that such a low rate of generating cornering force results in poor stability in the travelling directions of the vehicle at high speed and necessitates an increased angular displacement of the steering wheel when a vehicle is going to be turned round or proceeds along a curved path at a high speed, and accordingly, such tire is dangerous for a driver. The reduction in the maximum value of the cornering force makes it difficult to drive a vehicle along a curved path at a high speed, and if one dares to make a turn at a high speed with tires of low cornering force characteristics, then the vehicle skids and he may lose control of the vehicle.

Furthermore, the above reduction in the rigidity of the tread portion of the tire tends to lower the resistance against wearing in its transverse direction.

As described in the foregoing, the reasons for wearing of the tread portion of a tire have been heretofore believed to be due to mainly local contractions of that tire tread portion which is in contact with the road surface in both equatorial and transverse directions of the tire. The inventors, however, have found through experiments that when a vehicle is turned round, tires of the vehicle are twisted at those portions where they are in direct contact with the road surface responsive to the slip angle necessary for turning round, and that such twisting of the tires affects their wearing in a degree equivalent to or in excess of that of the above local contractions. In other words, if a tire producing a high cornering force for a given slip angle is used, then the degree of twisting its tread portion is small for the given slip angle, and hence the wearing loss of the tread portion of the tire is also small.

In the aforementioned two kinds of known pneumatic tires having cord elements arranged in a triangular fashion and at zero angle to the equatorial direction thereof respectively, the former tire has serious drawbacks in that its operative characteristics are dangerous due to the excessively high rigidity of its tread portion, and that it does not provide suitable comfortableness to the driver because of the excessively high level of its vibration and noise caused by the above high rigidity. In fact, due to the aforementioned drawbacks, some automobile manufacturers do not use the tire having metal wires embedded therein in so-called triangulation relation. On the other hand, the latter tire has disadvantages in that its operative characteristics are also unsatisfactory due to the excessively low rigidity of its tread portion, and that its wearing loss is too large caused by the above low rigidity.

Other important factors affecting the operative characteristics of the pneumatic tire will now be described to further clarify the features of the invention.

When a pneumatic tire mounted on a vehicle is filled with air to a suitable pressure level and subjected to driving on a road, then there are applied stresses both in the equatorial and transverse directions of the tire. Almost all of the stress in the equatorial direction of the tire is borne by the breaker member of the tire, and those cord elements of the breaker member which are disposed at small cord angles bear most of the stress while those cord elements which are disposed at large cord angles bear only very little of the stress.

Figure 3:
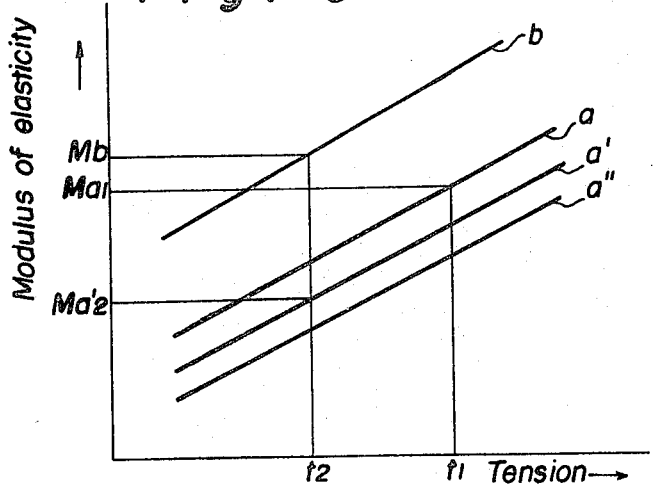
FIG. 3 is a graph illustrating relations between the modulus of elasticity of a breaker cord element and the tension applied thereto.

FIG. 3 shows the modulus of elasticity of such cord elements to constitute breaker members, in which the abscissa represents the stress applied on the cord elements and the ordinate modulus of elasticity of the cord elements when they are elongated to a certain length (to be referred to simply as the modulus of elasticity hereinafter). The curve $a$ represents the modulus of elasticity of those cord elements which are disposed at a comparatively small cord angle both in the conventional breaker member and the breaker member of the invention, the curve $a'$ the modulus of elasticity of cord elements disposed at a comparatively large cord angle in the conventional breaker member, the curve $a''$ the modulus of elasticity of the cord elements of curves $a$ and $a'$ as measured prior to their vulcanization, and the curve $b$ modulus of elasticity of cord elements disposed at a comparatively large cord angle in the breaker member according to the invention.

It has been a common practice in pneumatic tires of the kind to use reinforcing cord elements having substantially the same properties both for those to be arranged at comparatively large cord angles and for those to be arranged at comparatively small cord angles. Such reinforcing cord elements are assembled in rubberized sheets forming the breaker member of the tire prior to its vulcanization, and hence, as the circumference of the breaker member is elongated during the vulcanizing process of the tire, the reinforcing cord elements are also elongated. When the vulcanization is over, the cord elements are secured at elongated positions determined by various vulcanizing conditions, such as the tensile force and heat applied to the cord elements during the vulcanizing process, etc.

Such elongation of each cord element causes an increase in its modulus of elasticity, and besides, in view of the fact that the degree of elongation of the cord elements is varied as the cord angle of disposing the cord elements in the breaker member is changed, it will be understood that upon completion of the vulcanizing process of the tire, the level of the modulus of elasticity of the cord elements disposed at small cord angles will be raised from that of the curve $a''$ to that of the curve $a$ and retained there, while the corresponding level of the modulus of elasticity of the cord elements disposed at large cord angles will be also raised from that of the curve $a''$ to that of the curve $a'$ and retained there.

As described in the foregoing referring to the findings of the inventors, when the tire is filled with air to a certain pressure level, those cord elements arranged at small cord angles act to bear a tensile force $T_1$ representing a larger portion of the entire tension applied to the belt by said air pressure and each cord element arranged at the small angle shares a part $t1$ of said tension $T_1$ to produce a modulus of elasticity $Ma1$, whilst those cord elements arranged at large cord angles act to bear a tensile force $T_2$ representing a smaller portion of the entire tension applied to the belt by said air pressure and each cord element arranged at the large angle shares a part $t2$ of said tension $T_2$ to produce a modulus of elasticity $Ma'2$, which is smaller than $Ma1$.

Accordingly, in conventional pneumatic tire of this kind, those reinforcing cord elements embedded in the breaker member at small cord angles have modulus of elasticity characteristics which are different from those of cord elements disposed at large cord angles, as shown by curves $a$ and $a'$ of FIG. 3. Such difference in the modulus of elasticity tends to reduce the composite reinforcing effects of such cord elements having different cord angles. In addition, when the tire is filled with air to a certain pressure level, there is produced a difference of tensile stress, say $(t1t2)$ in FIG. 3, between the cord elements arranged at different angles, and hence, the difference in the modulus of elasticity is further increased, say as large as $(Ma1-Ma'2)$. Thus, the composite reinforcing effects are further reduced.

On the other hand, according to a preferred form of the invention, those cord elements having modulus of elasticity characteristics represented by the curve $a$ of FIG. 3 when vulcanized are disposed in the breaker member at small cord angles with respect to the equatorial direction of the member, while those cord elements having high modulus of elasticity characteristics represented by the curve $b$ when vulcanized are disposed in the breaker member at large cord angles with respect to the equatorial direction thereof. Accordingly, the difference in modulus of elasticity characteristics between the cord elements disposed at different cord angles, such as those represented by $(2-a')$, can be obviated even after vulcanization. In the pneumatic tire of the invention, when the tire is pressurized by filling air therein, the modulus of elasticity $Mb$ according to the curve $b$ for the tensile stress $t2$ is selected to be the same as or close to that modulus of elasticity $Ma1$ which is according to the curve $a$ for the tensile stress $t1$ or to be larger than $Ma1$. Thus, effective reinforcing action of the cord elements is ensured.

With such effective reinforcing action of the cord elements, it is made possible to provide desired rigidity to the tread portion of the tire by means of the breaker member of the invention. In other words, according to the principles of the invention, it is made possible to provide a pneumatic tire having a tread portion of ideal rigidity by obviating both the excessively high rigidity of the tread portion including a breaker member reinforced by rigid metal wires and the excessively low rigidity of the tread portion including a breaker member reinforced by cord elements disposed at zero inclination, which are made of flexible material.

The breaker member according to the invention also results in cost reduction because of the fact that cord elements having the characteristics shown by the curve $b$ of FIG. 3 can be prepared by utilizing only conventional materials, if so desired. For instance, the cord elements represented by the curve $b$ of FIG. 3 can be made of the same material as that of the curve $a$ by processing it under properly selected treating conditions, such as the way of twisting, the tension to be applied to the cord elements during the process, etc, so that the modulus of elasticity of the former may become higher than that of the latter. In view of the aforementioned fact that the use of reinforcing cord elements having a high modulus of elasticity as the cord elements disposed at large cord angles enables more effective reinforcement than that produced by using conventional reinforcing cord elements, it is now made possible to obtain a pneumatic tire having tread portion provided with a higher rigidity than that of conventional tires even if the number of cord elements to be embedded therein is reduced. In other words, the pneumatic tire of the invention can be produced at a low cost because various cord elements to be used in the tire at different cord angles can be made of the same material, and furthermore, the number of such cord elements to be embedded in the breaker member of the tire can be reduced to a level less than the corresponding number in conventional tires.

It should be noted here that according to the principles of the invention, the materials to be used for various cord elements of the pneumatic tire are not limited to be the same, but it is apparently permissible to use different materials for different reinforcing cord elements of the tire in order to fulfill the objects of the invention most effectively.

By utilizing the optimum rigidity of the tread portion of the pneumatic tire of the invention, the cornering force characteristics and self-aligning torque characteristics of the tire can be improved to a great extent, and at the same time, the wearing loss of the tire can be considerably reduced without causing any ill effects on the vibration and comfortableness of a vehicle equipped with such tires.

The pneumatic tire of the invention will now be described in further detail referring to different embodiments illustrated in the drawings.

Figure 4:
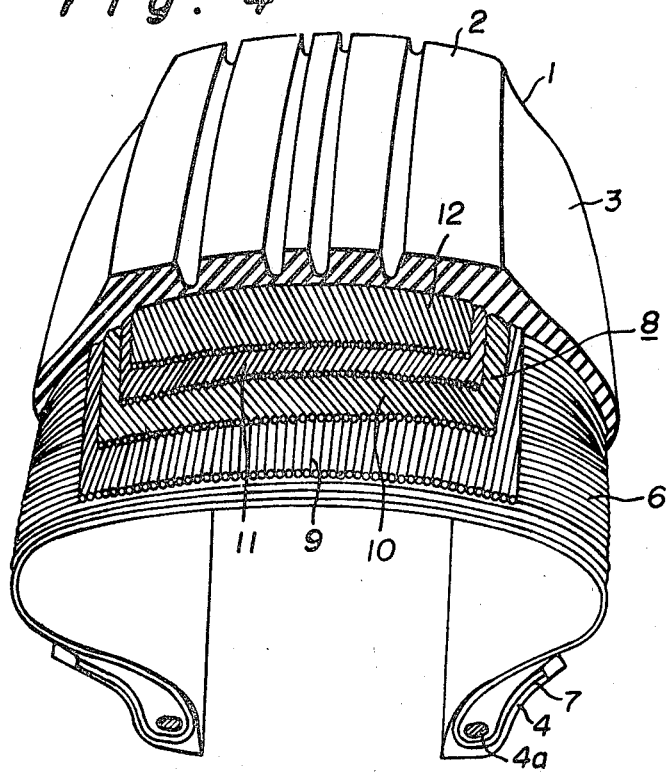
FIG. 4 is a fragmentary perspective view illustrating construction of a pneumatic tire embodying the present invention, shown with a part thereof cut away.
Figure 5:
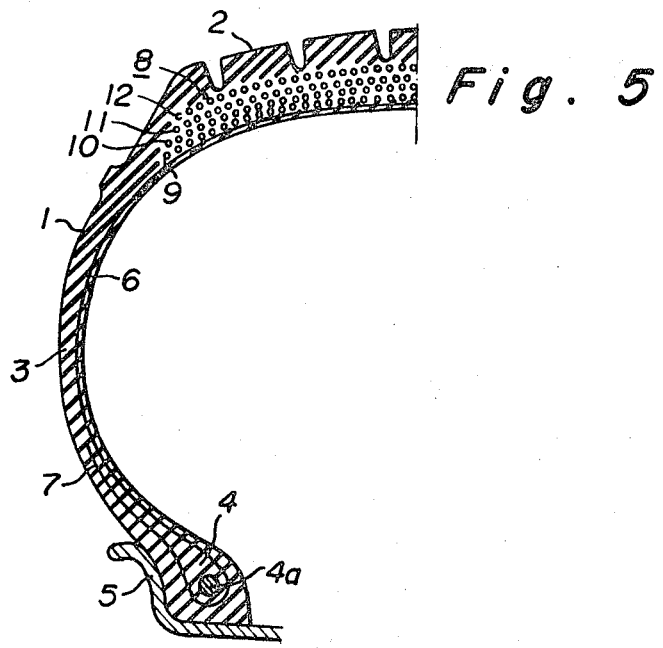
FIG. 5 is a transverse sectional view of the tire, showing one half thereof.

Referring to FIGS. 4 and 5, the tire, which is generally represented by the reference numeral 1, comprises a tread portion 2, a pair of sidewall portions 3, and a pair of bead portions 4. The tire is shown as mounted on the rim member 5. The pair of sidewall portions 3 are reinforced by means of a carcass 6 consisting of at least one rubberized sheet and by end portions 7 of the carcass folded around the bead rings $4a$ of the bead portion 4. The cord elements of the carcass 6 in this particular embodiment of the invention are disposed substantially along the radial directions radiating from the axis of rotation of the tire. In other words, cord elements of the carcass are laid substantially in parallel with each other at the tread portion of the tire so as to intersect with the equatorial direction of the tire at right angles.

Figure 6:
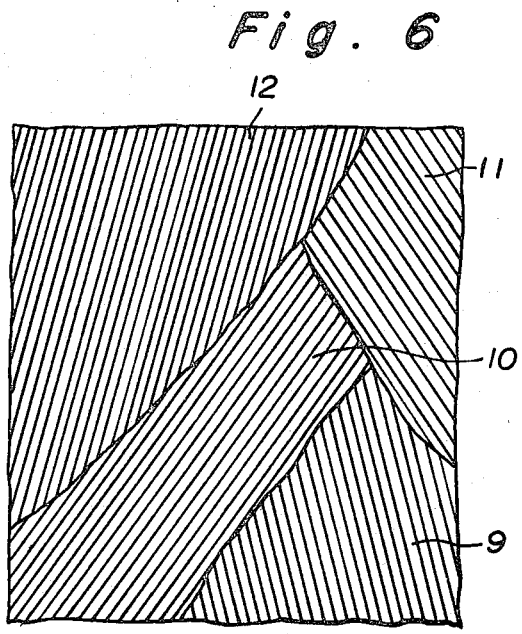
FIG. 6 is a diagrammatic illustration of the layout of different sheets in a four-sheet breaker member embodying the invention.

In order to provide proper reinforcement to the tread portion 2, there is inserted a breaker member 8 between the tread portion 2 and the carcass 6. In this particular embodiment, the breaker member 8 comprises four rubberized sheets 9, 10, 11 and 12. Each sheet 9, 10, 11, or 12 is made of a rubberized tire fabric comprising cord elements consisting of highly flexible materials, such as natural resins, synthetic resins, and other inorganic flexible materials. As shown in FIG. 6, the disposition of the sheets 9 and 12 is such that the parallel cord elements of the sheet 9 are deviated from the equatorial direction of the tire by an angle of 13 degrees in one direction, while the elements of the sheet 12 by the same angle of 13° but in the opposite direction. The sheets 10 and 11 are sandwiched between the sheets 9 and 12 in such a manner that the direction of the parallel cord elements of the sheet 10 is deviated from the equatorial direction of the tire by an angle of 33° in one direction, while that of the sheet 11 by the same angle of 33° in the opposite direction. Those cord elements which are deviated from the equator of the tire by 13° have a modulus of elasticity of 1.5 gram/denier at an elongation of 2 percent, while those cord elements deviated by 33° have a modulus of elasticity of 2 gram/denier at an elongation of 2 percent.

Figure 7:
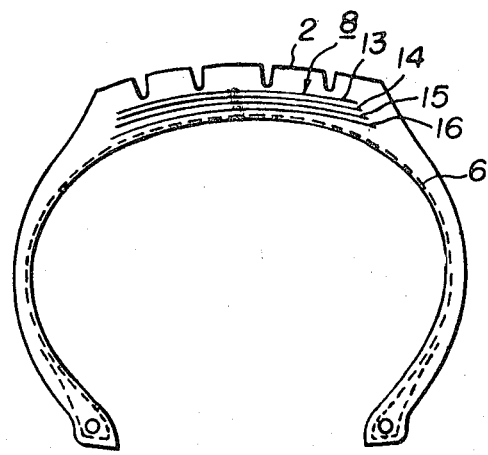
FIGS. 7 and 8 are sectional views showing different embodiments of the invention.

FIG. 7 shows another embodiment of the invention, in which four sheets 13, 14, 15, and 16 are used in the breaker member, however, the cord elements of the second and the fourth sheets 14 and 16 as counted from the farthest from the axis of the tire are deviated from the equatorial direction of the tire by 13° on opposite sides thereof respectively, while those of the first and the third sheets 13 and 15 are deviated from the equator by 33° on the opposite sides thereof respectively.

Figure 8:
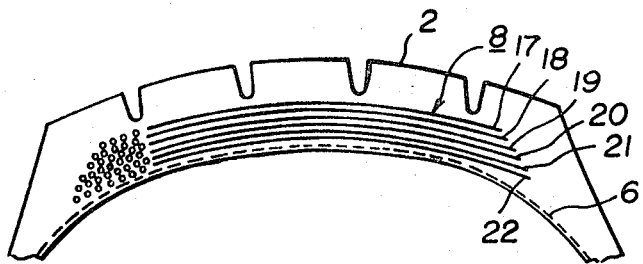

FIG. 8 shows still another embodiment of the invention, in which six sheets 17, 18, 19, 20, 21, and 22 are used to form the breaker member 8. In this embodiment, the sheets 17 and 22 are so disposed that cord elements thereof are deviated from the equatorial direction of the tire by an angle between 13° to 50°. The cord elements of the sheets 18, 19, 20, and 21 are deviated from the equator by angles between 5° to 20°.

It is permissible to select different angles of deviation of cord elements in each sheet of the breaker member within the aforementioned ranges so as to attain different combinations of cord angles. According to the invention, it is made possible to obtain a tread portion having an excellent rigidity by disposing cord elements having different moduli of elasticity at different cord angles, as described in the foregoing. Furthermore, the rigidity of the tread portion of the tire can be selected as desired within a certain range by using proper combination of the cord angles for different sheets in the breaker member thereof.

Figure 9:
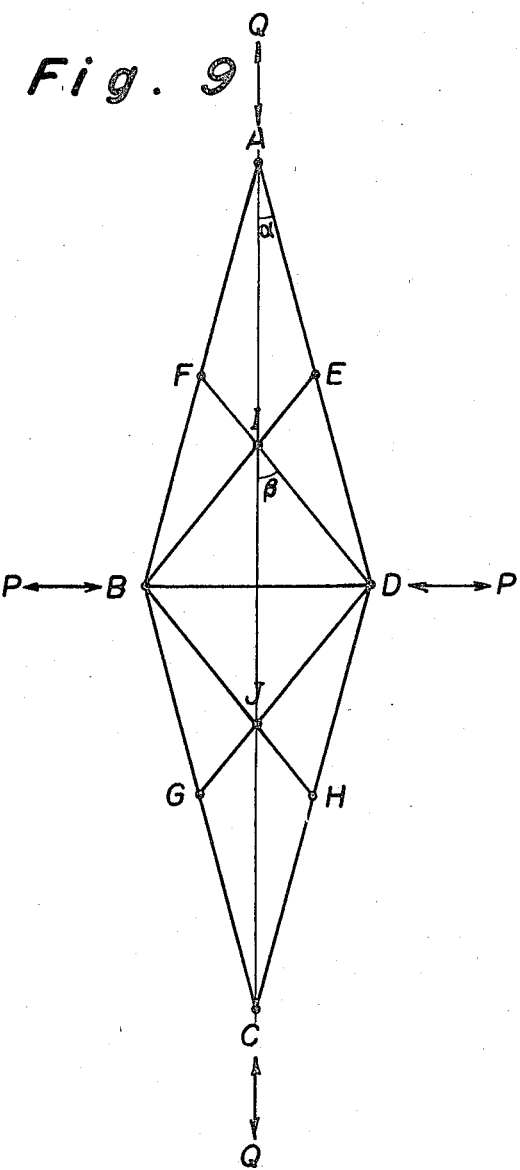
FIG. 9 is a greatly simplified diagrammatic illustration of a preferred layout of the breaker cord elements according to the invention.

FIG. 9 is a simplified diagram illustrating the layout of cord elements in the breaker member of a tire embodying the invention. Those cord elements deviated from the equatorial direction Q—Q of the tire by a small angle $\alpha$ in opposite directions form a number of narrow and long parallelograms, such as those similar to a parallelogram ABCD of the figure. In the figure, those cord elements deviated from the equator of the tire by a large angle $\beta$ in the opposite directions are indicated by lines EB, FD, GD, and HB, which are located inside of said parallelogram ABCD. A diagonal line BD of the parallelogram of the figure represents a cord element of the carcass 6. It has been found through experiments that particularly good results are obtained when one selects one cord angle $\alpha$ in the range of 5° to 20° while selecting the other cord angle $\beta$ which is larger than said angle $\alpha$ within the range of 13° to 50°, so that those cord elements deviated by the angle of $\beta$ may intersect with the sides of the parallelogram ABCD at intermediate points thereof. Best result has been obtained when those cord elements deviated by the large angle intersect with the sides of the parallelogram at about the middle points E, F, G, and H thereof. Such cord elements are bonded together by rubber in the process of rubberizing and vulcanizing the sheets, and hence, each intersecting point of the cord elements acts as a node of the cord element mechanism of the breaker member. It is apparent from FIG. 9 that each parallelogram formed by cord elements deviated by a small angle $\alpha$, such as the parallelogram ABCD, is reinforced by the other cord elements deviated by a large angle $\beta$ from the equator of the tire. Accordingly, the breaker member consisting of such cord elements has the optimum resistivity against strains caused by external forces, such as a force in the transverse direction P—P of the tire, a force along the equatorial direction Q—Q of the tire, a force in a direction perpendicular to the plane defined by the parallelogram, and a composite force of last mentioned forces in various directions.

Furthermore, the breaker member of such construction acts to provide the optimum rigidity to the tread portion of the tire even when nonmetallic cord elements are used therein. Such action of improving the rigidity of the tire tread is further increased if those cord elements deviated from the equator by a large angle, such as EB, FD, GD, and HB in FIG. 9, are provided with a higher modulus of elasticity that that of those cord elements deviated by a small angle from the equator, such as AB, BC, CD, and DA of FIG. 9.

FIG. 10a are curves representing the relations between the slip angle and the cornering force of different tires, in which the curve $D_3$ represents said relations of a tire provided with a breaker member according to the invention, the curve $A_3$ said relations of a tire having a breaker member consisting of cord elements in a triangular fashion as described hereinbefore, and the curve $C_3$ said relations of a tire having a breaker member consisting of cord elements disposed at zero inclination or small angle to the equator thereof. If one compares the cornering force characteristics $D_3$ of the tire according to the invention and the similar characteristics $A_3$ of the tire including metal wires disposed in a triangular fashion, it is apparent that while the cornering force of the tire of the invention is slightly smaller than that of the tire having said metal wires in the range of small slip angles, however, the dangerous decrease of cornering force form a certain maximum value responsive to the increase of the slip angle in excess of a certain critical angle, which is about 6° in case of the curve $A_3$, is completely eliminated in the tire of the invention.

It should be noted here that not only the aforementioned decrease of the cornering force, but quick saturation of the cornering force in the aforementioned tire having metal wires is also dangerous, because the driver cannot foresee such quick saturation beforehand, the cornering force of the tire of the invention is increased at a rate slower than that of the aforementioned tire having metal wires disposed in so-called triangulation.

Furthermore, the cornering force characteristics of the tire according to the invention are such that its increasing trend is maintained even when the slip angle increases beyond 14°.

On the other hand, in comparison of the cornering force characteristics $D_3$ of the tire according to the invention against the cornering force characteristics $C_3$ of a tire having a reduced rigidity at the tread portion thereof, the characteristics $C_3$ is free from the dangerous decrease of the cornering force as indicated in the curve $A_3$, however, the general level of the cornering force of the curve $C_3$ is considerably lower than that of the curve $D_3$, and hence, the maximum cornering force of the former is also smaller than that of the latter.

In short, with the cornering force characteristics of the tire of the invention as represented by the curve $D_3$, it is made possible to obviate shortcomings of conventional tire characteristics as represented by the curves $A_3$ and $C_3$, and thus, high stability together with excellent steering characteristics of the tire can be obtained.

FIG. 10b shows the relations between the slip angle and the self-aligning torque of different tires, in which the curve $A_4$ represents said relations of a tire including metal wires disposed in a triangular fashion, and the curve $D_4$ said relations of the tire of the invention. It is apparent from the figure that maximum value of the self-aligning torque occurs in the case of the tire of the invention at a larger slip angle than that in the case of the conventional tire having said metal wires. After the maximum values of the self-aligning torques are reached, the rate of decrease of the self-aligning torque of the tire of the invention is smaller than that of the curve $A_4$, and hence, that slip angle which corresponds to zero self-aligning torque in case of the tire of the invention is larger than that in case of the conventional tire represented by the curve $A_4$. In addition, in view of the fact that the self-aligning torque of the tire of the invention for small slip angles is smaller than that of said conventional tire, it is possible to control the steering wheel with a smaller force with the tires of the invention than that with said conventional tires. Therefore, the excellent self-aligning torque characteristics of the tire of the invention make it possible to provide excellent operative properties to a vehicle equipped with said tires.

In order to clarify the advantages of the tire of the invention, its wearing loss was measured, and it was ascertained through experiments that the wearing loss of the tire of the invention was less by about 30 percent than that of a tire having a breaker member consisting of cord elements disposed substantially at zero inclination or small angle to the equator thereof. The excessive vibration and noise accompanying the tire including metallic cord elements disposed in a triangular fashion are eliminated completely in the tire of the invention. Thereby, the tire of the invention enables the improvement of the comfortableness of the driver of the vehicle equipped with pneumatic tires while retaining the same level of wearing loss as that of the tire including metal wires embedded therein in a triangular fashion.

The invention has been described in the foregoing by referring to particular embodiments thereof, however, it should be understood that a number of different modifications are possible within the scope of the invention.

What we claim is:

1. A pneumatic tire having a breaker member, comprising a pair of bead portions including metal wires, a carcass extending between said pair of bead portions substantially in radial directions radiating from the axis of rotation of the tire, said carcass consisting of at least one rubberized sheet including cord elements made of flexible material, a tread portion mounted on said carcass with a suitable spacing between them, and a breaker member inserted between said tread portion and said carcass, said breaker member consisting of at least a first group of sheets including cord elements of a certain modules of elasticity and a second group of sheets including cord elements of a different modulus of elasticity, said cord elements in each sheet of the breaker member being laid in parallel within the sheet, said first group having at least a pair of sheets whose cord elements deviate from the equatorial direction of the tire by a first angle on opposite sides of said equatorial direction, said second group having at least a pair of sheets whose cord elements deviate from said equatorial direction by a second angle on opposite sides of the equator, said second angle being larger than said first angle, said first angle being in the range of 5° to 17°, said second angle being in the range of 13° to 50°, and said certain modules of elasticity of the first group of sheets being smaller than that of said different modules of elasticity of said second group of sheets said cord elements of said second group of sheets intersecting with at least one parallelogram formed by the cord elements of said first group of sheets at an apex of a large interior angle of said one parallelogram.

2. A pneumatic tire according to claim 1, wherein said breaker member comprises four sheets, and the first and the fourth sheets thereof counted from the axis of rotation of the tire constitute said first group while the remaining sheets thereof constitute said second group.

3. A pneumatic tire according to claim 1, wherein said breaker member comprises four sheets, and the second and the fourth sheets thereof counted from the axis of rotation of the tire constitute said second group, while the remaining sheets thereof constitute said first group.

4. A pneumatic tire according to claim 1, wherein said breaker member comprises four sheets, and the second and third sheets thereof counted from the axis of rotation of the tire constitute said first group, while the remaining sheets thereof constitute second group.

5. A pneumatic tire according to claim 1, wherein said breaker member comprises six sheets, and the first and last sheets thereof counted from the axis of rotation of the tire constitute said first group, while the remaining sheets thereof constitute said second group.

6. A pneumatic tire according to claim 1, wherein said breaker member comprises six sheets, and the first and last sheets thereof counted from the axis of rotation of the tire constitute said second group, while the remaining sheets thereof constitute said first group.

7. A pneumatic tire according to claim 1, wherein said breaker member comprises six sheets, and the third and fourth sheets thereof counted from the axis of rotation of the tire constitute said first group, while the remaining sheets thereof constitute said second group.

8. A pneumatic tire according to claim 1, wherein said cord elements of said breaker member are made of flexible materials selected from the materials consisting of natural resins, synthetic resins, glass fiber materials.

9. A pneumatic tire having a breaker member, comprising a pair of bead portions including metal wires, a carcass extending between said pair of bead portions substantially in radial directions radiating from the axis of rotation of the tire, said carcass consisting of at least one rubberized sheet including cord elements made of flexible material, a tread portion mounted on said carcass with a suitable spacing between them, and a breaker member inserted between said tread portion and said carcass, said breaker member consisting of at least a first group of sheets including cord elements of a certain modulus of elasticity and a second group of sheets including cord elements of a different modulus of elasticity, said cord elements in each sheet of the breaker member being laid in parallel within the sheet, said first group having at least a pair of sheets whose cord elements deviate from the equatorial direction of the tire by a first angle on opposite sides of said equatorial direction, said second group having at least a pair of sheets whose cord elements deviate from said equatorial direction by a second angle on opposite sides of the equator, said second angle being larger than said first angle, said first angle being in the range of 5° to 17°, said second angle being in the range of 13° to 50°, and said certain modulus of elasticity of the first group of sheets being smaller than that of said different modulus of elasticity of said second group of sheets, said cord elements of said second group of sheets intersect with at least one parallelogram formed by the cord elements of said first group of sheets both at an apex of a large interior angle of said one parallelogram and at about the middle point of that side of said one parallelogram which is opposite to said apex thereof.

10. A pneumatic tire having a breaker member, comprising a pair of bead portions including metal wires a carcass extending between said pair of bead portions substantially in radial directions radiating from the axis of rotation of the tire, said carcass consisting of at least one rubberized sheet including cord elements made of flexible material, a tread portion mounted on said carcass with a suitable spacing between them, and a breaker member inserted between said tread portion and said carcass, said breaker member consisting of at least a first group of sheets including cord elements of a certain modulus of elasticity and a second group of sheets including cord elements of a different modulus of elasticity, said cord elements in each sheet of the breaker member being laid in parallel within the sheet, said first group having at least a pair of sheets whose cord elements deviate from the equatorial direction of the tire by a first angle on opposite sides of said equatorial direction, said second group having at least a pair of sheets whose cord elements deviate from said equatorial direction by a second angle on opposite sides of the equator, said second angle being larger than said first angle, said first group comprising a pair of sheets including cord elements having a modulus of elasticity of 1.5 gram/denier at an elongation of 2 percent said sheets of the first group being deviated from the equatorial direction of the tire by 13° on opposite sides of said equatorial direction, and said second group comprising a pair of sheets including cord elements having a modulus of elasticity of 2 gram/denier at an elongation of 2 percent, said sheets of the second group deviating from the equatorial direction of the tire by 33° on opposite sides of said equatorial direction.

* * * * *